(12) United States Patent
Yoo et al.

(10) Patent No.: US 7,974,470 B2
(45) Date of Patent: Jul. 5, 2011

(54) METHOD AND APPARATUS FOR PROCESSING AN IMAGE

(75) Inventors: Yong-seok Yoo, Seoul (KR); Young-su Moon, Seoul (KR); Jun-mo Kim, Seoul (KR); Yoon-kyung Kim, Seoul (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 948 days.

(21) Appl. No.: 11/882,118

(22) Filed: Jul. 30, 2007

(65) Prior Publication Data

US 2008/0170783 A1    Jul. 17, 2008

(30) Foreign Application Priority Data

Jan. 15, 2007    (KR) .................. 10-2007-0004413

(51) Int. Cl.
*G06K 9/34* (2006.01)
(52) U.S. Cl. ...................................... 382/173
(58) Field of Classification Search .......... 382/162, 382/164, 168, 171, 173–180, 181, 190, 199, 382/254, 274; 345/426, 428, 581, 582, 589, 345/592, 629; 358/531
See application file for complete search history.

(56) References Cited

U.S. PATENT DOCUMENTS

| | | | | |
|---|---|---|---|---|
| 5,557,684 | A | 9/1996 | Wang et al. | 382/107 |
| 6,721,446 | B1 * | 4/2004 | Wilensky et al. | 382/162 |
| 7,430,339 | B2 * | 9/2008 | Rother et al. | 382/284 |
| 7,606,417 | B2 * | 10/2009 | Steinberg et al. | 382/173 |
| 7,692,664 | B2 * | 4/2010 | Weiss et al. | 345/592 |

FOREIGN PATENT DOCUMENTS

KR    2006-0101571    10/2006

OTHER PUBLICATIONS

Caselles, V. et al., "Geodesic Active Contours," International Journal of Computer Vision, 22(1), 1997, pp. 61-79.
Chan, T. et al., "Active Contours Without Edges," IEEE Transactions on Image Processing, vol. 10, No. 2, Feb. 2001, pp. 266-277.
Elgammal, A. et al., "Non-parametric Model for Background Subtraction," Lecture Notes in Computer Science, vol. 1843, ECCV 2000, pp. 751-767.
Kass, M. et al., "Snakes: Active Contour Models," International Journal of Computer Vision, 1998, pp. 321-331.
Kolmogorov, V. et al., "Bi-Layer Segmentation of Bionocular Stereo Video," Proceedings of IEEE Computer Vision and Pattern Recognition, vol. 2, 2005, pp. 407-141.
Ruzon, M. et al., "Alpha Estimation in Natural Images," IEEE Conference on Computer Vision and Pattern Recognition 2000, vol. 1, pp. 18-25.
Wang, J. et al., "Representing Moving Images with Layers," IEEE Transactions on Image Processing Special Issue: Image Sequence Compression, vol. 3, No. 5, May 1994, pp. 1-13.
U.S. Appl. No. 11/898,780, filed Sep. 14, 2007, Jun-mo Kim et al., Samsung Electronics Co., Ltd. of Suwon-si, Republic of Korea.

* cited by examiner

*Primary Examiner* — Jose L Couso
(74) *Attorney, Agent, or Firm* — Staas & Halsey LLP

(57) ABSTRACT

Provided are an image processing method and apparatus capable of improving the result of segmenting an image and discriminatively determining the extent of processing the image. In the method, the extent of segmentation of the image is calculated; the result of segmentation is compensated for and the extent of processing the image is determined, based on the calculated extent of segmentation; and each region of the image is discriminatively processed according to the determined extent of processing. Accordingly, it is possible to improve the precision of the result of segmentation and continuously control the extent of discriminative processing around a complex image object.

22 Claims, 10 Drawing Sheets

METHOD AND APPARATUS FOR PROCESSING AN IMAGE

CROSS-REFERENCE TO RELATED PATENT APPLICATIONS

This application claims priority from Korean Patent Application No. 10-2007-0004413, filed on Jan. 15, 2007, in the Korean Intellectual Property Office, the disclosure of which is incorporated herein in its entirety by reference.

BACKGROUND OF THE INVENTION

1. Field of the Invention

The present invention relates to a method and apparatus for processing an image, and more particularly, to a method and apparatus for improving the result of segmenting an image into a plurality of regions and discriminately determining the extent of processing each of the regions.

2. Description of the Related Art

Much attention has been paid to research into the field of segmentation related digital video signal processing. New technology has been continuously applied for efficient analysis and representation of this field. Today, the field of segmentation is indispensable to the field of multimedia application.

Various fields of application for video signal segmentation have been introduced, and the result of segmentation can be effectively applied to image quality processing, moving picture coding, object recognition, and so on.

In particular, in the field of image quality processing, if the foreground (hereinafter referred to as "FG") and background (hereinafter referred to as "BG") of a moving picture can be separated from each other, it is possible to give a three-dimensional (3D)/realistic effect to the moving picture by discriminately processing the FG and the BG. Here, the FG includes major parts of a scene, such as main characters and objects of the scene, and the BG includes minor parts of the scene, such as a mountain, trees, etc.

If an image is obtained by segmenting the image into an interest region (which includes a FG) and a non-interest region (which includes a BG), and performing binary discriminative processing on the interest region and the non-interest region, excessive degradation of image quality occurs around the border of the processed regions, e.g. the border between the FG and the BG.

FIG. 1 illustrates a conventional, filter-based smoothing method. Referring to FIG. 1, binary processing is performed on a FG region and a BG region (see the left drawing of FIG. 1), but in the filter-based smoothing method, the extent of processing is discriminatively applied to the FG region and the BG region in order to continuously and gradually reduce the extent of processing over the border therebetween, so that the inclination of the graph is smoothly curved around the border (see the right drawing of FIG. 1).

The filter-based smoothing method may be performed by applying various smoothing filters, such as a linear filter or a Gaussian filter, to the regions of a segmented image. This method is easy to perform, but basically causes over-smoothing, which degrades the image quality, and cannot compensate for a border between the regions.

FIG. 2 is a diagram illustrating a conventional, tri-map based matting method.

In the matting method, a FG color, BG color, and opacity are precisely estimated and recovered from pixels around the borders of a FG, a BG and an unknown region of a tri-map received from a user, and the recovered FG-color image is naturally combined with another received image. However, this method has the disadvantage that it can be applied only to images having a simple BG and whose FG color and BG color are significantly distinguished from each other, and its performance is determined by the precision of an input tri-map.

SUMMARY OF THE INVENTION

The present invention provides an image processing method and apparatus capable of compensating for the result of segmenting an image into regions and determining the extent of image processing according to the image characteristics of the border between the regions, thereby effectively increasing the precision of segmentation at the border and continuously and adaptively controlling the extent of discriminative processing.

According to an aspect of the present invention, there is provided a method of processing an image, the method including receiving the image and segmenting the image into a foreground and a background, calculating the extent of segmentation of the segmented image, compensating for the result of segmentation based on the calculated extent of segmentation, and determining the extent of processing the image, and discriminatively processing the image according to the determined extent of processing.

According to another aspect of the present invention, there is provided a method of processing an image, the method including segmenting the image into a foreground and a background, and outputting a FG/BG (foreground/background) binary map; constructing a tri-map based on the output FG/BG binary map, and calculating the extent of segmentation of each of sub regions of an unknown region of the tri-map; selecting a processing mode for the image based on the extent of segmentation, and compensating for the result of segmentation and determining the extent of discriminative processing the image according to the selected mode; and performing discriminative image processing on the foreground and the background of the image according to the determined extent of discriminative processing.

According to another aspect of the present invention, there is provided an apparatus for processing an image, the apparatus including a segmenting unit receiving the image and segmenting the image into a foreground and a background; a compensating/processing extent determining unit calculating the extent of segmentation of the segmented image, compensating for the result of segmentation based on the calculated extent of segmentation, and determining the extent of processing the image; and an image processing unit discriminatively processing the image according to the determined extent of processing.

According to another aspect of the present invention, there is provided a computer readable medium having recorded thereon a computer program for executing the above methods.

The details and improvement of the present invention over the prior art are set forth in the dependent claims of the present invention.

BRIEF DESCRIPTION OF THE DRAWINGS

The above and other aspects and advantages of the present invention will become more apparent by describing in detail exemplary embodiments thereof with reference to the attached drawings in which.

DETAILED DESCRIPTION OF THE INVENTION

Exemplary embodiments of the present invention will now be described in detail with reference to the accompanying drawings.

Figure 1:
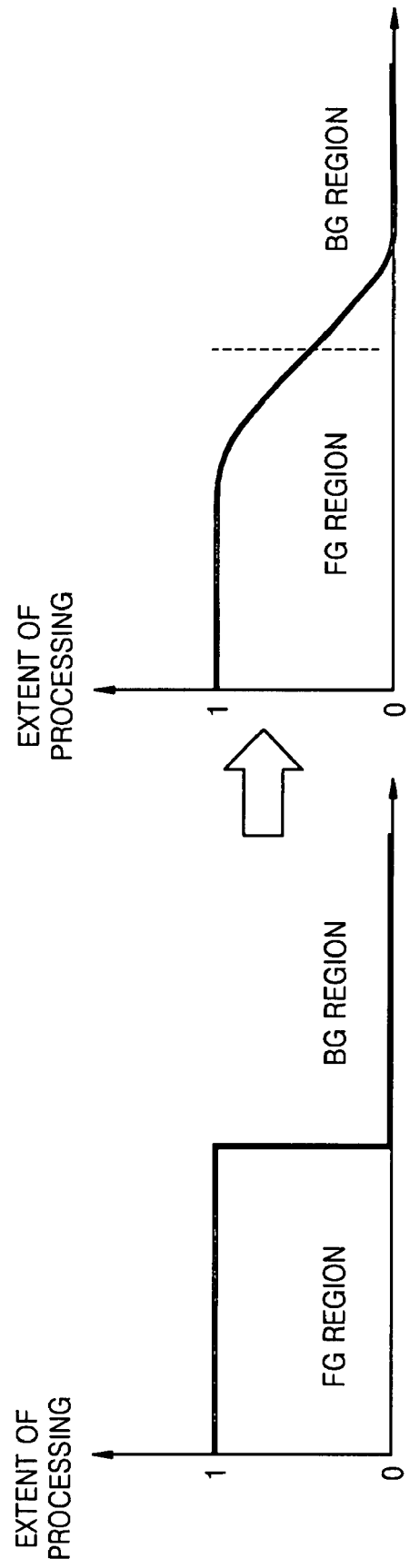
FIG. 1 is a diagram illustrating a conventional, filter-based smoothing method.
Figure 2:
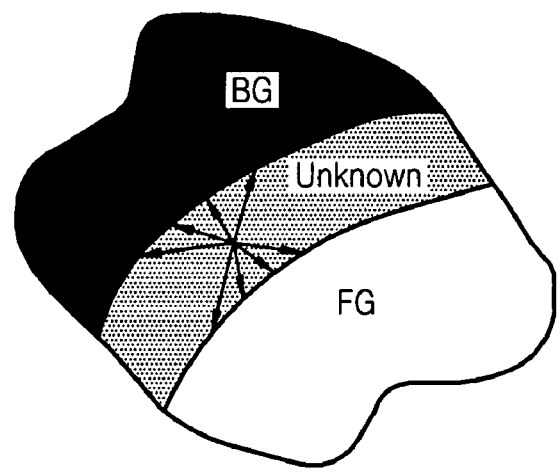
FIG. 2 is a diagram illustrating a conventional, tri-map based matting method.
Figure 3:
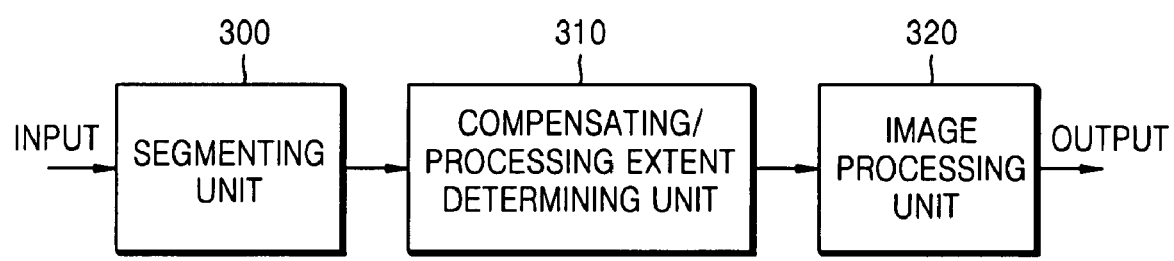
FIG. 3 is a schematic block diagram of an image processing apparatus according to an embodiment of the present invention.

FIG. 3 is a schematic block diagram of an image processing apparatus according to an embodiment of the present invention. Referring to FIG. 3, the image processing apparatus includes a segmenting unit 300, a compensating/processing extent determining unit 310, and an image processing unit 320.

First, an image (a TV broadcast image, a user content image, an image reproduced from a storage medium, etc.) captured by an image signal input device (not shown) that includes a moving picture capturing device, such as a video camera, a digital camera, or a camera phone, is input to the segmenting unit 300. Here, the image may be an analog image or a digital image. It is assumed that if the image is an analog image, it is converted into a digital image signal before being input to the segmenting unit 300. Thus, a sequence of digital image signals are sequentially input to the segmenting unit 300.

The segmenting unit 300 segments the received image into a foreground (FG) and a background (BG), and outputs a FG/BG binary map.

That is, a mask of the FG/BG region of the received image is output as follows:

$$\text{Mask}(x, y) = \begin{cases} 1, & \text{if } (x, y) \in FG \\ 0, & \text{if } (x, y) \in BG \end{cases} \quad (1)$$

Here, various conventional segmenting techniques may be used in order to segment the received image into a plurality of regions.

In particular, a segmenting method using background subtraction has been introduced by Ahmed Elgammal et al. ["Non-parametric Model for Background Subtraction", Lecture Notes in Computer Science, Volume 1843, ECCV 2000, pp. 751-767]. Background subtraction is the fastest and simplest way but can be applied to only still images.

A more general segmenting technique was introduced by J. Y. A. Wang et al. ["Representing Moving Images with Layers", IEEE Trans. Image Processing, vol. 3, pp. 625-638, September 1994]. The technique was patented in U.S. Pat. No. 5,557,684, entitled "System for encoding image data into multiple layers representing regions of coherent motion and associated motion parameters". The US patent discloses a technique of estimating two-dimensional (2D) motion and performing image segmentation based on the estimated motion.

Also, an article entitled, "Motion Segmentation and Outlier Detection," introduced by P. H. S. Torr [Ph. D. thesis, Univ. of Oxford, 1995], discloses a segmenting technique using three-dimensional (3D) motion estimation, in which the motion of major characterizing points of an image in a 3D space are estimated, and the characterizing points are segmented into a FG and a BG.

An article entitled "Bi-Layer Segmentation of Binocular Stereo Video", introduced by V. Kolmogorov et al. [Proc. IEEE Computer Vision and Pattern Recognition (CVPR), vol. 2, pp 407-414, 2005], discloses a segmenting technique using the fact that the depths of pixels of an image, that is, the distance between each pixel and a camera, provide important information for image segmentation.

It is preferable to use an image segmentation method disclosed in Korean Patent Application No. 2006-0101571, filed by the present applicant. In this method, a high-speed image segmentation method with high precision is selectively applied according to the characteristics of an image, depending on whether an object moves independently of a camera, thereby improving the precision and speed of processing.

However, errors will inevitably occur in segmentation, regardless of the segmenting technique employed, and the image quality will be degraded when the erroneous segmentation is applied directly to image processing. Accordingly, a method of preventing degradation of image quality even if an error occurs in the result of image segmentation, according to exemplary embodiments of the present invention, will be described.

The compensating/processing extent determining unit 310 generates a tri-map from the binary map including the FG and BG regions, which is received from the segmenting unit 300, and calculates the extent of segmentation of any unknown region of the tri-map. Then, optimum processing modes for the respective regions are selected based on the extent of segmentation, and the result of segmentation is compensated for and the extent of discriminative processing is determined according to each of the processing modes. The construction of the compensating/processing extent determining unit 310 will later be described in greater detail with reference to FIG. 4.

The image processing unit 320 performs discriminative image processing on each region of the image according to the extent of the discriminative processing received from the compensating/processing extent determining unit 310, based on the brightness, contrast, and resolution of the each region.

The image processing may include brightness processing, focus processing, fog processing, sharpness processing, contrast processing, edge reinforcement processing and chromosteropsis processing.

Brightness processing makes the FG region bright and the BG region dark. Focus processing leaves the FB region and blurs the BG region. Fog processing maintains the original state of the FG region but adds fog into the BG region. Sharpness processing increases the sharpness of the FG region. Contrast processing increases the contrast of the FG region. Edge reinforcement processing sharpens the edges of the FG region. In chromosteropsis processing, blue fog is included into the BG region.

One of the above processings may be selectively used or they may be used together with special processing. preferably, edge reinforcement processing and focus processing are used together so as to improve the 3D effect of the image.

For example, when the 3D effect of the image is improved by discriminatively processing the FG region and the BG region by using brightness processing, and particularly, by increasing the brightness of the FG region by 20% and reducing the brightness of the BG region by 20%, image processing is discriminatively performed on each region of the image by applying the extents of processing, received from the compensating/processing extent determining unit 310, which are adaptively and smoothly distributed; mapping the extents of processing so that the brightness of each region is increased or reduced from −20 to 20%; and performing discriminative processing using the mapping result, without performing a binary brightness process.

Figure 4:
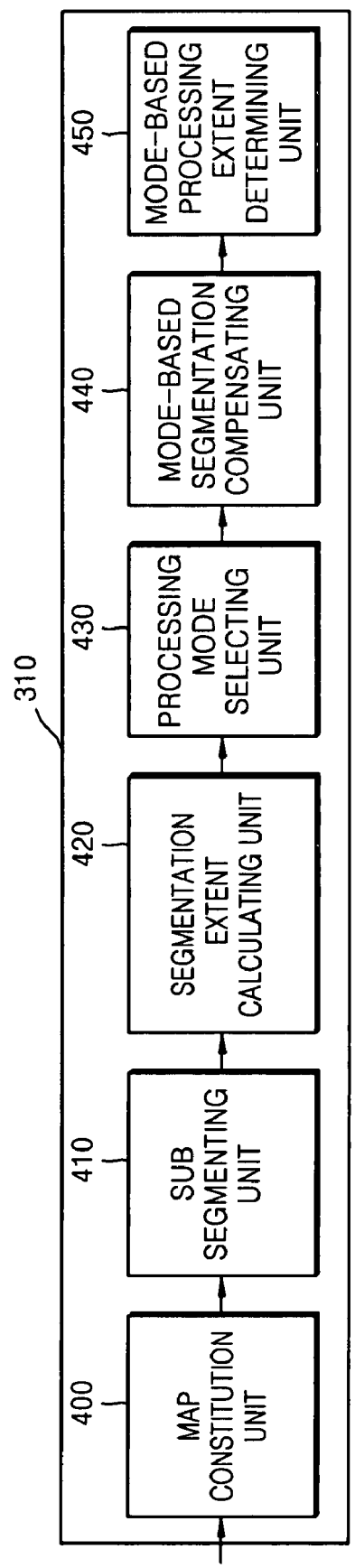
FIG. 4 is a detailed block diagram of a compensating/processing extent determining unit illustrated in FIG. 3, according to an embodiment of the present invention.

FIG. 4 is a block diagram illustrating in detail the compensating/processing extent determining unit 310 of FIG. 3. Referring to FIG. 4, the compensating/processing extent determining unit 310 includes a map constitution unit 400, a sub segmenting unit 410, a segmentation extent calculating unit 420, a processing mode selecting unit 430, a mode-based segmentation compensating unit 440, and a mode-based processing extent determining unit 450.

The map constitution unit 400 sets the unknown region in the tri-map based on information regarding a FG/BG region-based binary map received from the segmenting unit 300.

Figure 6:
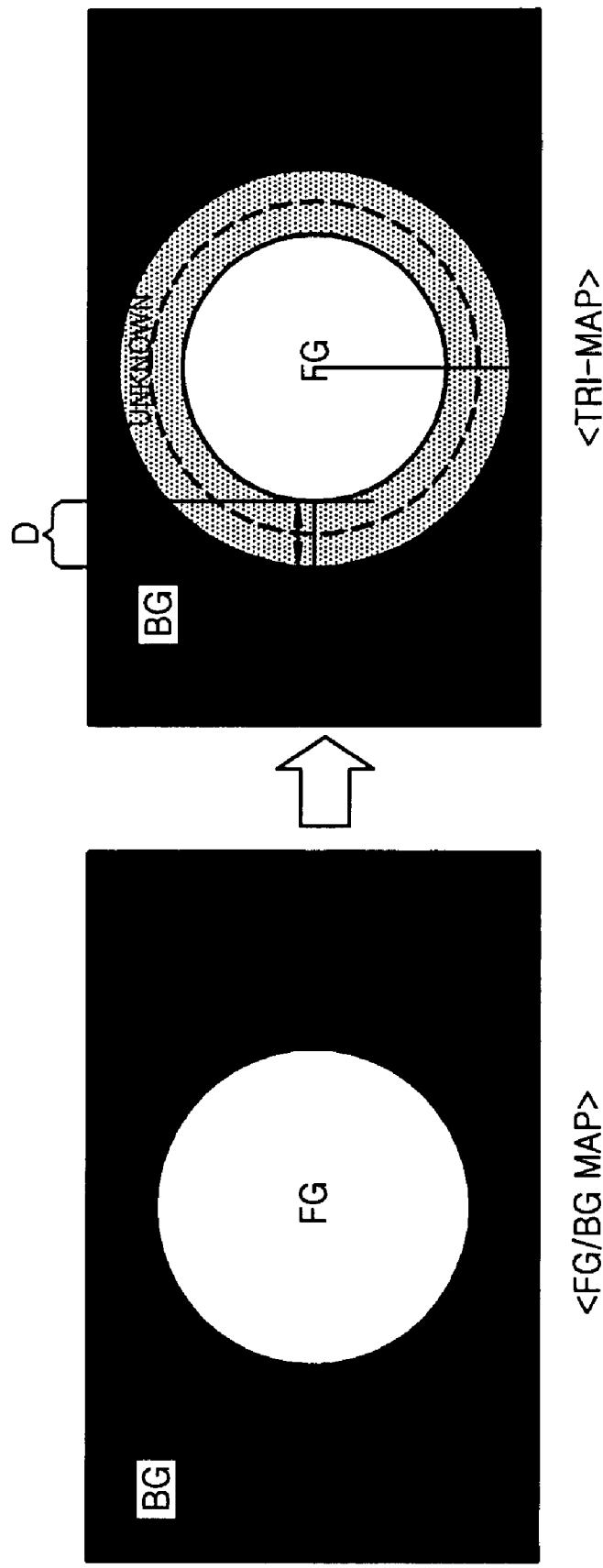
FIG. 6 is a diagram illustrating the construction of a tri-map of an image that is segmented into regions, according to an embodiment of the present invention.

The left diagram of FIG. 6 illustrates a binary map that includes a FG region and a BG region, and the right diagram thereof illustrates a tri-map that further includes an unknown region according to an embodiment of the present invention.

The border between the FG region and the BG region in the left diagram is indicated with a dotted line in the right diagram. The unknown region may be arbitrarily set by a user. The range of the unknown region may be determined according to the system characteristics in consideration of the precision or speed of image processing.

The unknown region is preferably comprised of points within a distance of D/2 from the border.

Then, the FG region and the BG region, but not the unknown region, are respectively defined again as the FG region and the BG region of the tri-map.

The sub segmenting unit 410 segments the unknown region into sub regions, each including a part of the FG region and the BG region, in order to calculate the local FG/BG characteristics in the unknown region, based on the information regarding the trip-map received from the map constitution unit 400.

Figure 7:
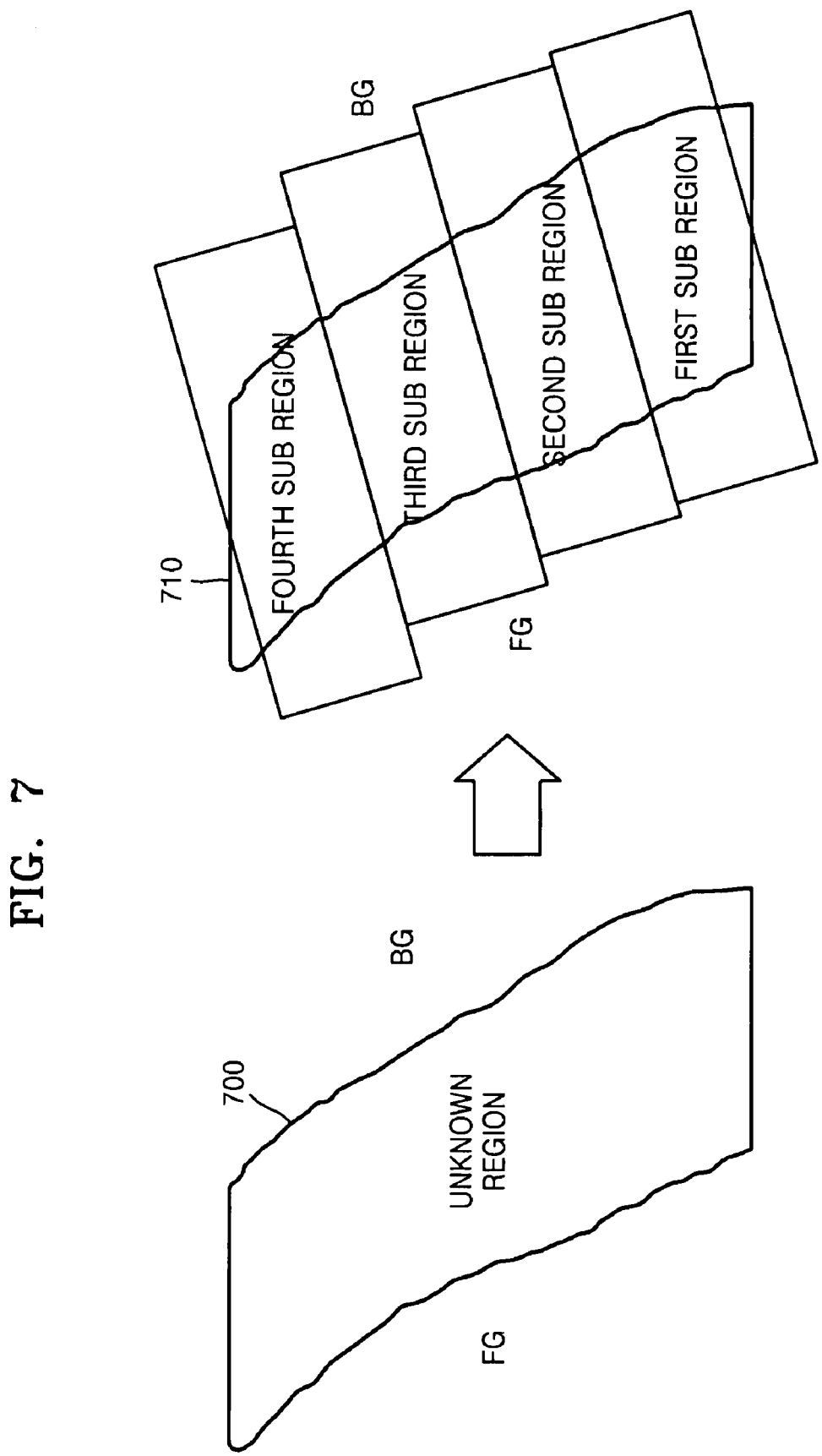
FIG. 7 is a diagram illustrating the construction of sub regions of a tri-map, according to an embodiment of the present invention.

The left diagram of FIG. 7 illustrates the information regarding a tri-map 700, which is received from the map constitution unit 400, the tri-map 700 including a FG region, an unknown region, and a BG region. The right diagram of FIG. 7 illustrates a tri-map 710 in which the unknown region is segmented into sub regions.

FIG. 7 illustrates that the unknown region is segmented into first through fourth sub regions, but the present invention is not limited thereto. Also, as illustrated in FIG. 7, each of the sub regions includes parts of the FG region and the BG region which are adjacent to the unknown region.

The segmentation extent calculating unit 420 calculates the extent of segmentation of the FG/BG region into the sub regions in order to determine how the color distribution characteristics of the FG region and the BG region differ. A mode for compensating for the result of segmentation and determining the extent of processing is selected according to the calculated extent of segmentation. That is, if the extent of segmentation is greater than a threshold, a matting mode is used, and if the extent of segmentation is less than the threshold, a filtering mode is used.

Figure 8:
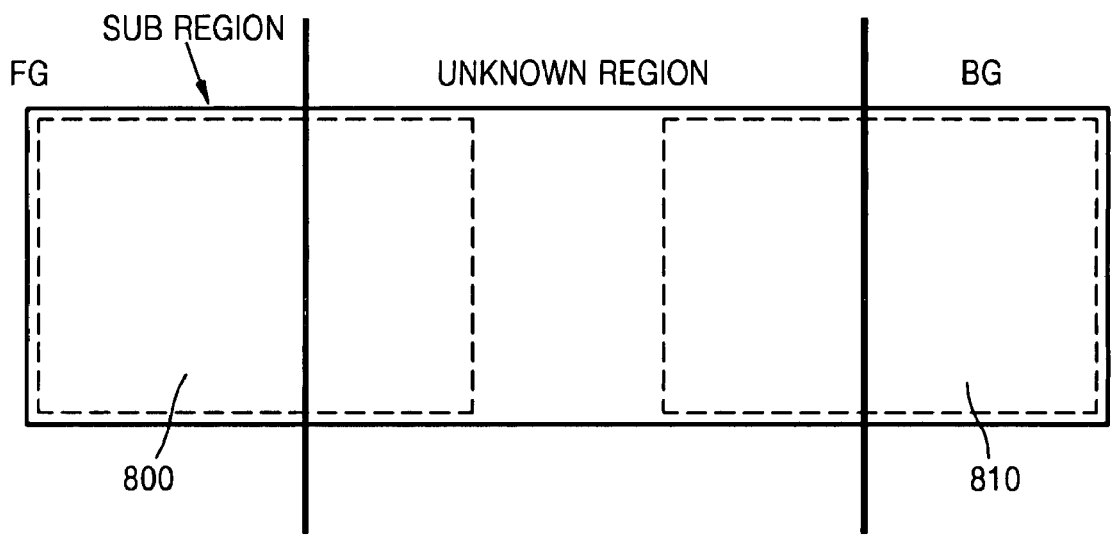
FIG. 8 is a diagram illustrating a method of calculating the extent of segmentation of each sub region of an unknown region, according to an embodiment of the present invention.

A method of calculating the extent of segmentation will be described with reference to FIG. 8.

First, a color histogram in an extended FG 800 (hereinafter defined as "$H_{FG}$") is calculated. The extended FG 800 includes a FG region included in a sub region, and a part of an unknown region, which is adjacent to the FG region.

Next, a color histogram in an extended BG 810 (hereinafter defined as "$H_{BG}$") is calculated. The extended BG 810 includes a BG region included in the sub region, and a part of the unknown region, which is adjacent to the BG region. Then, the extent of segmentation (hereinafter defined as "$F_{FG/BG}$") is calculated using the color histograms $H_{FG}$ and $H_{BG}$.

The extent of segmentation $F_{FG/BG}$ is a value between 0 and 1, and is obtained by calculating the color distribution density of each region and the normalized probability distance between major components for the color distributions of the two regions, as follows:

$$F_{FG/BG} = \text{Normalized\_similarity}(H_{FG}, H_{BG}) \quad (2)$$

Referring to Equation (2), as the extent of segmentation $F_{FG/BG}$ approaches 0, the color distributions of the two regions are more similar, and as the extent of segmentation $F_{FG/BG}$ approaches 1, the color distributions of the two regions are less similar.

Figure 9:
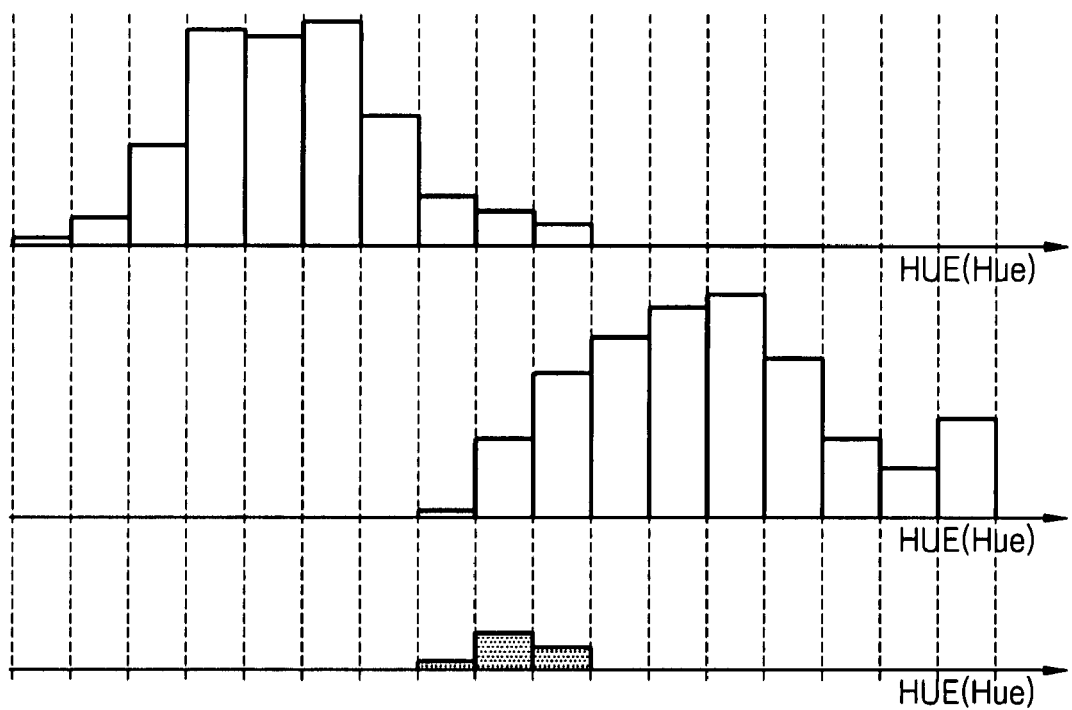
FIG. 9 is a diagram for explaining color histogram intersection according to an embodiment of the present invention.

FIG. 9 is a graph illustrating a method of calculating the extent of segmentation using color histogram intersection, according to an embodiment of the present invention.

The extent of segmentation $F_{FG/BG}$ is calculated by calculating hue values using the RGB values of the pixels of an extended FG region and an extended BG region, and calculating the histograms $H_{FG}$ and $H_{BG}$ of the regions using the hue values.

The upper part of FIG. 9 illustrates the color histogram $H_{FG}$ of the extended FG region and the middle part of FIG. 9 illustrates the color histogram $H_{BG}$ of the extended BG region. The lower part of FIG. 9 illustrates the values of color histogram intersection calculated using the following Equation (3).

Here, color histogram intersection is a general method of calculating the similarity between two images. Color histogram intersection is calculated by accumulating the minimum values of the bins of the histogram. Since color histogram intersection is obtained by comparing images including similar images, the greater the value of color histogram intersection, the higher the similarity between the images.

$$F_{FG/BG} = 1 - \frac{H_{Intersection}}{\left(\sum_i H_{FG} + \sum_i H_{BG}\right)/2}, \quad (4)$$

The extent of segmentation $F_{FG/BG}$ is calculated using the color histogram intersection $H_{Intersection}$, as follows:

$$H_{Intersection} = \sum \min(H_{FG}, H_{BG}) \quad (3)$$

The processing mode selecting unit 430 selects a processing mode, based on the extent of segmentation $F_{FG/BG}$ received from the segmentation extent calculating unit 420 and a threshold which may be preset or adaptively estimated from the image characteristics).

Here, if the extent of segmentation $F_{FG/BG}$ is greater than the threshold, the processing mode selecting unit 430 selects a matting mode. If the extent of segmentation $F_{FG/BG}$ is greater than the threshold, then the similarity between the FG region and the BG region (the difference between the colors of the FG region and the BG region) is high. Accordingly, the matting mode is selected when the BG is simple and the difference between the color values of the BG and a FG is great.

If the extent of segmentation $F_{FG/BG}$ is smaller than the threshold, the processing mode selecting unit 430 selects a filtering mode. If the extent of segmentation $F_{FG/BG}$ is smaller than the threshold, then the similarity between the FG region and the BG region (the difference between the colors of the FG region and the BG region) is low.

Here, the threshold may be preset according to the characteristics of the image processing system, such as the precision or speed of image processing.

Also, the threshold may be determined adaptively according to the image characteristics, such as whether the image changes quickly, is a still image, or includes a large number of human figures.

The mode-based segmentation compensating unit 440 compensates for the result of segmentation and the mode-based processing extent determining unit 450 determines the extent of processing, according to each mode, i.e. the matting mode and the filtering mode.

If the matting mode is performed, the mode-based segmentation compensating unit 440 estimates the FG color, the BG color, and opacity in each sub region using the matting mode, and compensates for the border between the regions based on the estimated colors and opacity. The mode-based processing extent determining unit 450 determines the extent of discriminative processing according to the compensated result of segmentation.

The FG color, BG color, and opacity of each pixel of the unknown region is computed by:

$$C = \alpha F + (1-\alpha)B \quad (5),$$

wherein C denotes an observed color, F denotes an estimated color, B denotes the estimated BG color, and α denotes the estimated opacity.

Figure 10:
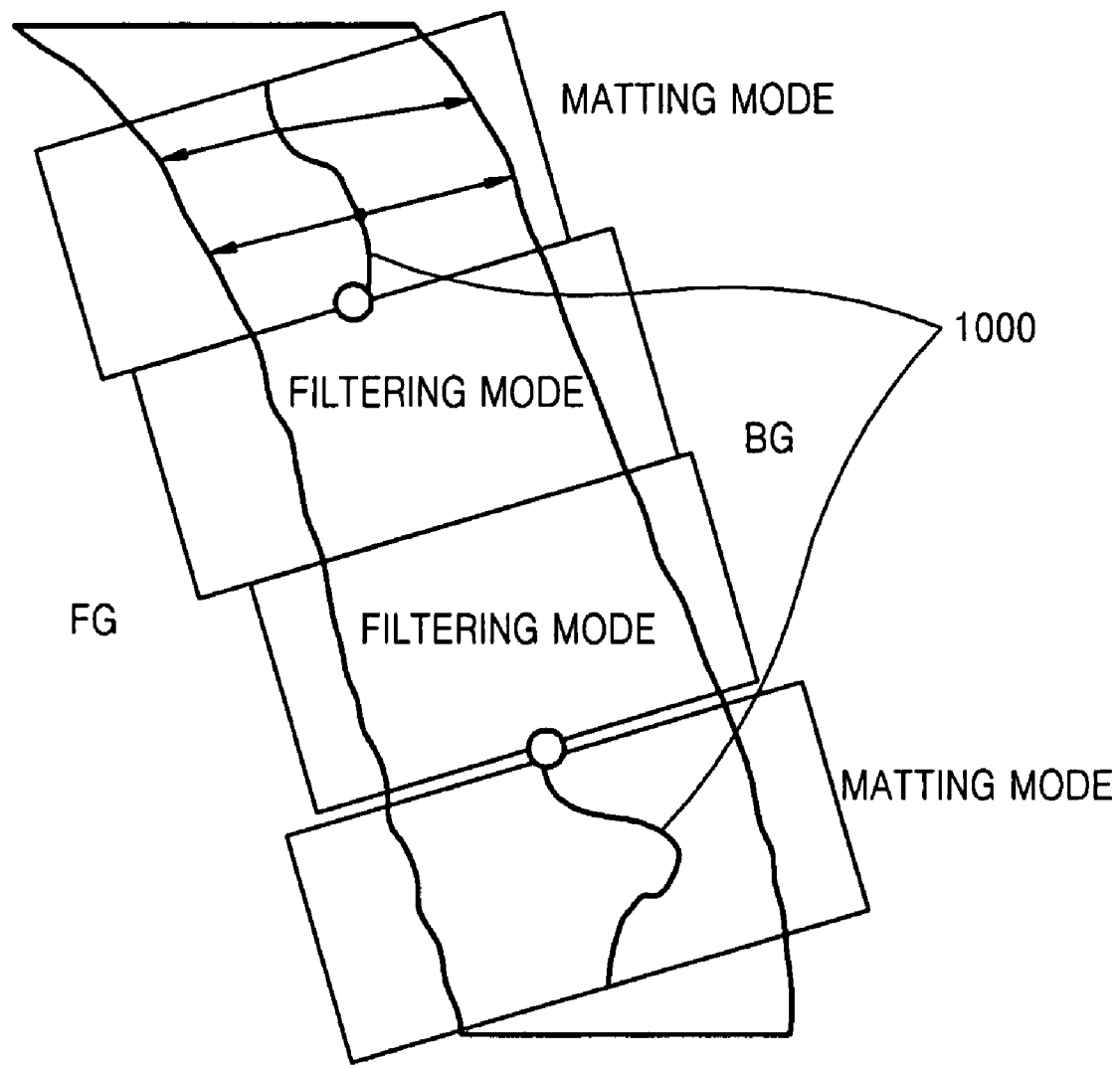
FIG. 10 is a diagram illustrating a method of compensating for the result of segmentation and determining the extent of processing in each sub region according to a matting mode, according to an embodiment of the present invention.

More specifically, referring to FIG. 10, the matting mode is performed in the first and fourth sub regions. Here, if the opacity is estimated to be a predetermined value, e.g. 0.5, the border between the FG region and the BG region is compensated for using a profile having an opacity value of 0.5. Also, this profile is set as a discriminative processing distribution profile.

Estimation of the opacity (α) is disclosed in greater detail in "Alpha estimation in natural images", introduced by Ruzon [CVPR 2000, pp. 10-18, June 2000].

The matting mode is preferably used when the BG is simple and the difference between the colors of the BG and a FG is great. In particular, the matting mode may be used to effectively compensate for the result of segmentation and determine the extent of processing in order to achieve the blending effect of the BG and the FG, e.g. in order to render curly hair around a face.

If the filtering mode is performed, the mode-based segmentation compensating unit 440 selectively compensates for the border between the FG region and the BG region. The mode-based segmentation compensating unit 440 performs border resetting in the unknown region using various types of active contour models. Also, the mode-based segmentation compensating unit 440 achieves more continuous segmentation by reflecting the result of segmentation in an adjacent matting mode.

The active contour models have been introduced in greater detail by M Kass ["Snakes: Active contour models", IJCV, 1988], by V Caselles ["Geodesic Active Contours", IJCV, 1997], and by T. F. Chan ["Active contours without edges", Image processing, IEEE Transaction, 2001].

Figure 11:
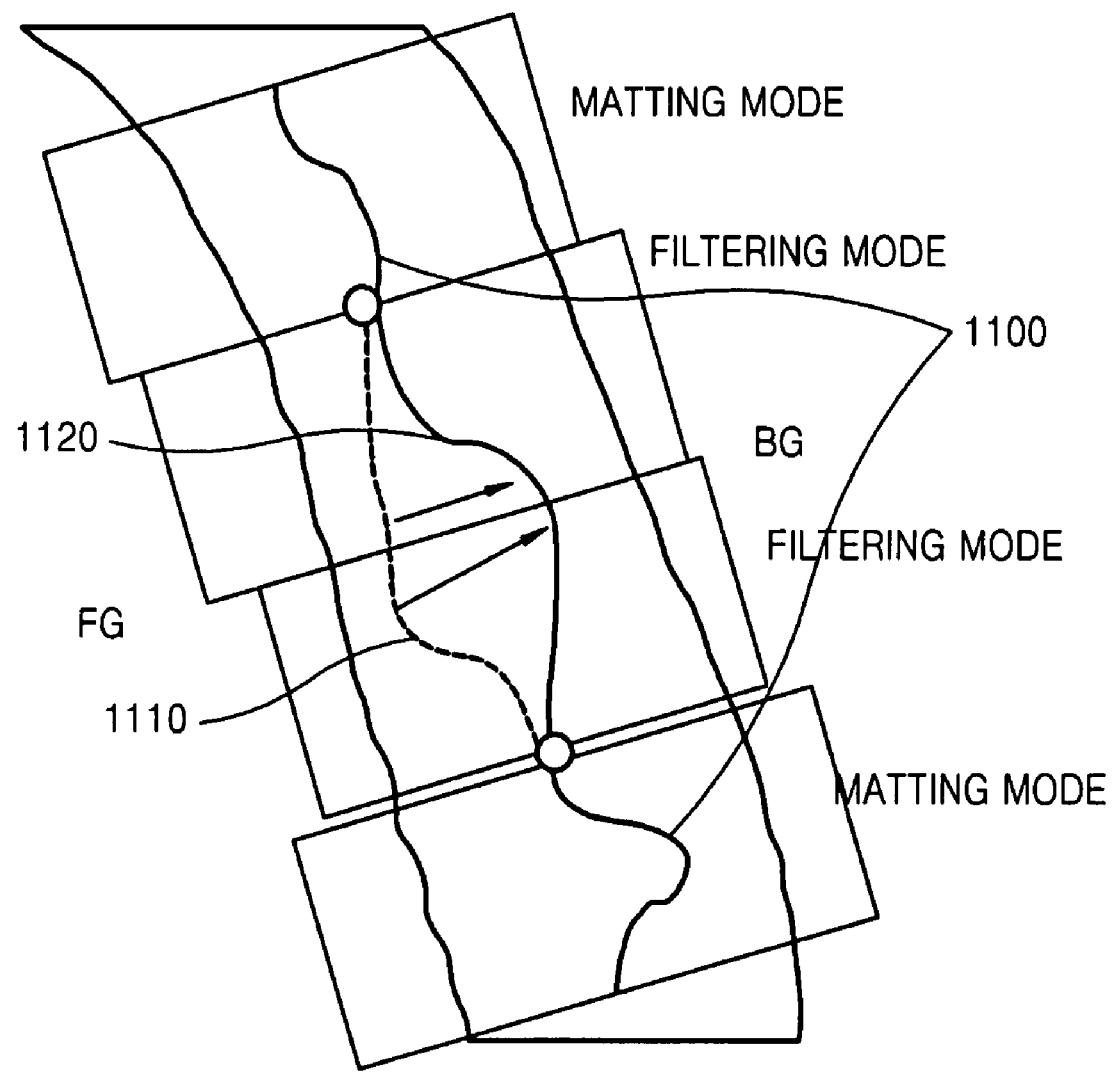
FIG. 11 is a diagram illustrating a method of compensating for the result of segmentation in each sub region according to a filtering mode, according to an embodiment of the present invention.

Referring to FIG. 11, the mode-based segmentation compensating unit 440 performs the filtering mode on the second and third sub regions. Here, reference numeral 1100 denotes a compensated border corresponding to the extent of processing in the matting mode. Reference numeral 1110 denotes an initial contour in the filtering mode, and reference numeral 1120 denotes a final contour in the filtering mode.

That is, FIG. 11 illustrates movement from an initial border to a compensated border. The compensated contour has continuity with the compensated border obtained when processing the first and fourth sub regions in the matting mode.

The mode-based processing extent determining unit 450 determines the extent of discriminative processing, based on the compensated border.

Figure 12:
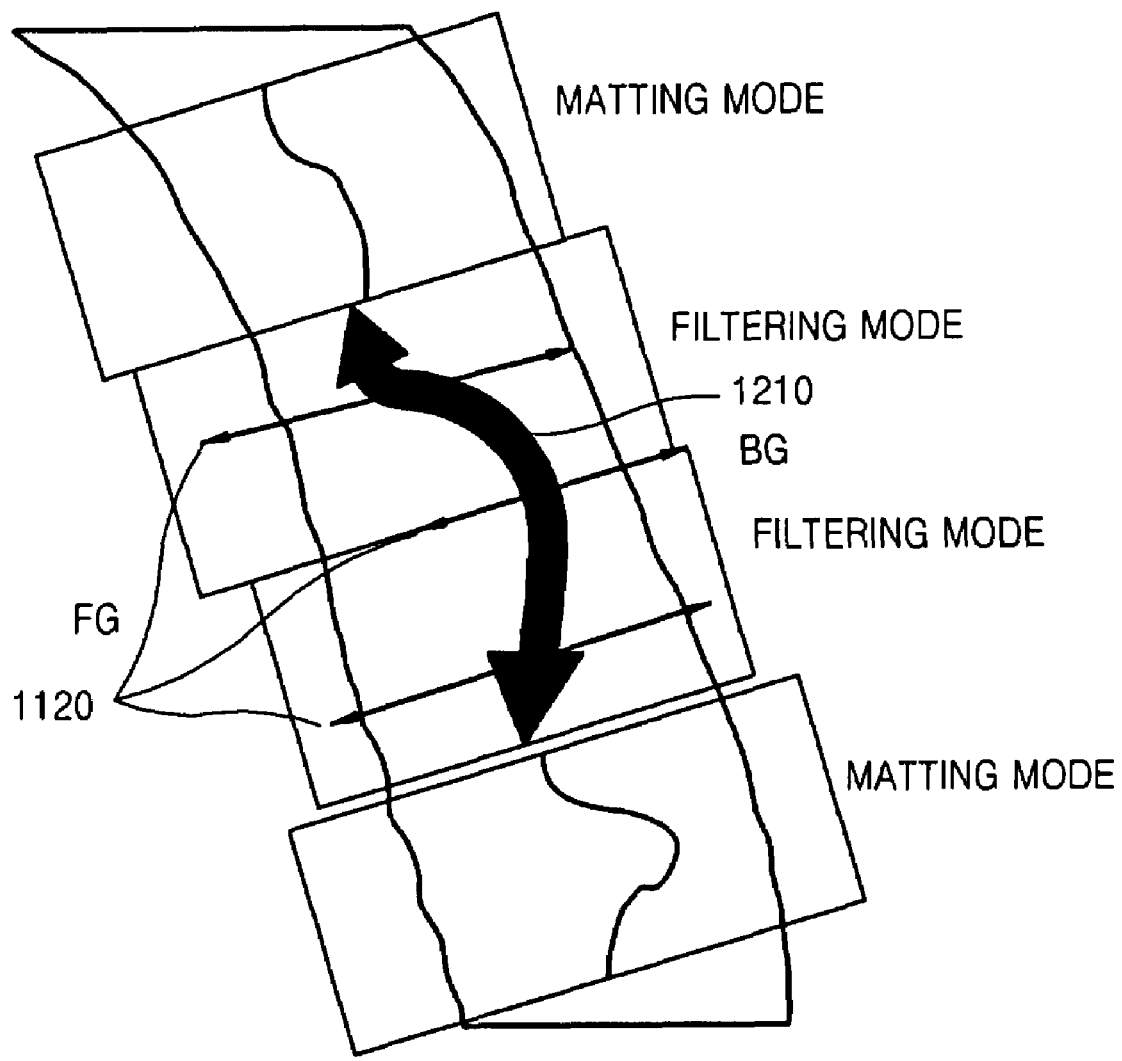
FIG. 12 is a diagram illustrating a method of determining the extent of processing in each sub region according to the filtering mode, according to an embodiment of the present invention.

Referring to FIG. 12, the extent of processing changes smoothly from the FG region to the BG region with respect to the compensated border.

Interpolation is performed on discriminative processing extent profiles of adjacent matting mode sub regions located at both edges of the image, so as to determine a discriminative processing extent profile of a filtering mode sub region between the matting mode sub regions.

In the filtering mode, continuous discriminative processing is performed at a location where image segmentation is first performed by using filter-based smoothing, when the BG is complex or the colors of the BG and the FG are not significantly differentiated from each other around the border. Alternatively, energy-based border compensating techniques may be used.

Figure 5:
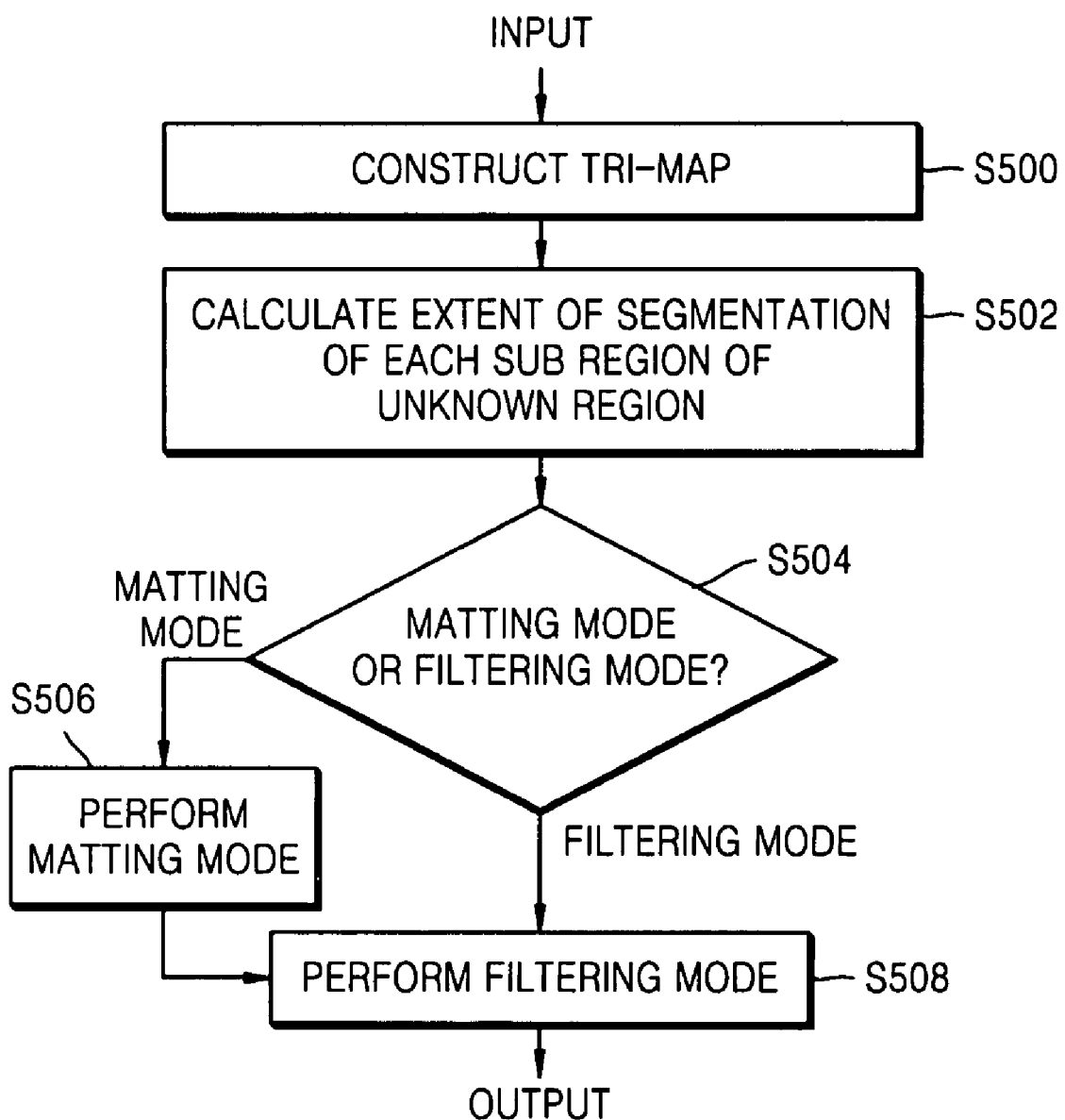
FIG. 5 is a flowchart illustrating a method of compensating for the result of segmenting an image into regions and determining the extent of processing each of the regions, according to an embodiment of the present invention.

FIG. 5 is a flowchart illustrating a method of compensating for the result of segmentation and determining the extent of image processing, according to an embodiment of the present invention. Referring to FIG. 5, when receiving a mask of a FG/BG region from the segmenting unit 300, the compensating/processing extent determining unit 310 generates a trimap having an unknown region of a predetermined size from a binary map that includes a FG region and a BG region (operation S500). The unknown region is segmented into sub regions.

Next, the extent of segmentation of each of the sub regions of the unknown region is calculated (operation S502). Then, a mode for compensating for and determining the extent of image processing the result of segmentation in units of the sub regions is determined (operation S504).

If it is determined in operation S504 that the mode is the matting mode, the matting mode is performed so as to compensate for the result of segmentation and determine the extent of image processing in units of the sub regions (operation S506).

If it is determined in operation S504 that the mode is the filtering mode, the filtering mode is performed so as to compensate for and determine the extent of image processing in units of the sub regions (operation S508). The result of performing the matting mode (the compensated result of segmentation) is preferably reflected when performing the filtering mode.

The present invention can be embodied as computer readable code on a computer readable medium. Here, the computer readable medium may be any recording apparatus capable of storing data that is read by a computer system, e.g. a read-only memory (ROM), a random access memory (RAM), a compact disc (CD)-ROM, a magnetic tape, a floppy disk, an optical data storage device, and so on. Also, the computer readable medium may be a carrier wave that transmits data, for example via the Internet.

According to the present invention, it is possible to improve the precision of segmentation and continuously control the extent of discriminative processing around a complex image object by calculating the extent of segmentation of regions of a segmented image, compensating for the result of segmentation based on the extent of segmentation, determining the extent of image processing, and discriminatively processing each region of the image according to the extent of image processing. Therefore, even if an error occurs during the segmentation of the image, the extent of discriminative processing can be controlled without degrading the image quality.

Also, the matting mode and the filtering mode are selectively applied around the border between regions of an image based on the extent of segmentation, thereby effectively compensating for the result of segmentation and controlling the extent of image processing.

While this invention has been particularly shown and described with reference to exemplary embodiments thereof, it will be understood by those skilled in the art that various changes in form and detail may be made therein without departing from the spirit and scope of the invention as defined by the appended claims.

What is claimed is:

1. A method of processing an image, comprising:
receiving, by a processor, the image and automatically segmenting the image into a foreground and a background;
calculating, by the processor, an extent of segmentation of the segmented image, compensating for the result of segmentation based on the calculated extent of segmentation, and determining an extent of processing the image; and
discriminatively processing, by the processor, the image according to the determined extent of processing.

2. The method of claim 1, wherein the calculating comprises selecting a processing mode for compensating for the result of segmentation and determining the extent of processing, based on the calculated extent of segmentation, wherein the result of segmentation is compensated for and the extent of processing is determined according to the selected mode.

3. The method of claim 2, wherein the selecting comprises comparing the extent of segmentation with a predetermined threshold,
wherein, when the extent of segmentation is greater than the threshold, a matting mode is selected, and
when the extent of segmentation is smaller than the threshold, a filtering mode is selected.

4. The method of claim 1, after the receiving, further comprising setting an unknown region to be spaced a predetermined distance from a border between the foreground and the background.

5. The method of claim 4, after the setting, further comprising segmenting the unknown region into sub regions each including parts of the foreground and the background, where the parts of the foreground and the background are adjacent to the unknown region,
wherein the calculating comprises calculating the extent of segmentation of each of the sub regions.

6. The method of claim 5, wherein the extent of segmentation is calculated using a similarity between normalized color distribution characteristics of the sub regions.

7. The method of claim 5, wherein the extent of segmentation is calculated by calculating histogram intersection in units of the sub regions.

8. The method of claim 3, wherein when the matting mode is selected, the result of segmentation is compensated for and the extent of processing is determined, based on opacity estimated from the image.

9. The method of claim 3, wherein when the filtering mode is selected, the result of segmentation is compensated for using active contour models.

10. The method of claim 9, wherein when the filtering mode is selected, the result of segmentation is compensated for based on the result of compensating the result of segmentation in the matting mode.

11. The method of claim 9, wherein when the filtering mode is selected, the extent of processing is determined by performing interpolation based on the extent of processing in the matting mode.

12. A method of processing an image, comprising:
automatically segmenting, by a processor, the image into a foreground and a background, and outputting a FG/BG (foreground/background) binary map;
constructing, by the processor, a tri-map based on the output FG/BG binary map, and calculating an extent of segmentation of each of sub regions of an unknown region of the tri-map;
selecting, by a processor, a processing mode for the image based on the extent of segmentation, and compensating for the result of segmentation and determining an extent of discriminative processing the image according to the selected mode; and
performing discriminative image processing, by the processor, on the foreground and the background of the image according to the determined extent of discriminative processing.

13. A non-transitory computer readable medium having recorded thereon computer readable instructions that control at least one processor to implement the method of claims 1 through 12.

14. An apparatus processing an image, comprising:

a computer, comprising:

a segmenting unit receiving the image and automatically segmenting the image into a foreground and a background;

a compensating/processing extent determining unit calculating an extent of segmentation of the segmented image, compensating for the result of segmentation based on the calculated extent of segmentation, and determining an extent of processing the image; and an image processing unit discriminatively processing the image according to the determined extent of processing.

15. The apparatus of claim 14, wherein the compensating/processing extent determining unit selects a processing mode for compensating for the result of segmentation and determining the extent of processing, based on the calculated extent of segmentation; compensating for the result of segmentation according to the selected mode; and determining the extent of processing.

16. The apparatus of claim 14, wherein the compensating/processing extent determining unit comprises:

a map constitution unit setting an unknown region of a tri-map, based on FG/BG (foreground/background) region-based binary map information received from the segmenting unit;

a sub region segmenting unit segmenting the unknown region into sub regions each including parts of the FG and BG regions, based on information regarding the tri-map received from the map constitution unit;

a segmentation extent calculating unit calculating the extent of segmentation by calculating color distribution characteristics of the FG and BG regions of each of the sub regions;

a processing mode selecting unit comparing the extent of segmentation with a predetermined threshold and selecting a processing mode according to the comparison result;

a mode-based segmentation compensating unit compensating for the result of segmentation according to the processing mode; and a mode-based processing extent determining unit determining the extent of processing the image according to the processing mode.

17. The apparatus of claim 16, wherein the segmentation extent calculating unit calculates the extent of segmentation using a similarity between normalized color distribution characteristics of the sub regions.

18. The apparatus of claim 16, wherein the segmentation extent calculating unit calculates the extent of segmentation by calculating histogram intersection in units of the sub regions.

19. The apparatus of claim 16, wherein when the extent of segmentation is greater than a predetermined threshold, the processing mode selecting unit selects a matting mode, and when the extent of segmentation is smaller than the threshold, the processing mode selecting unit selects a filtering mode.

20. The apparatus of claim 19, wherein when the matting mode is selected, the mode-based segmentation compensating unit compensates for the result of segmentation based on opacity estimated from the image, and the mode-based processing extent determining unit determines the extent of processing the image based on the estimated opacity.

21. The apparatus of claim 19, wherein when the filtering mode is selected, the mode-based segmentation compensating unit compensates for the result of segmentation by using contour models, and the mode-based processing extent determining unit determines the extents of processing based on the result of compensating the result of segmentation.

22. The apparatus of claim 19, wherein when the filtering mode is selected, the mode-based segmentation compensating unit compensates for the result of segmentation by reflecting the result of compensating for the result of segmentation according to the matting mode, and the mode-based processing extent determining unit determines the extent of processing the image by performing interpolation based on the extent of processing of the matting mode.

* * * * *